June 20, 1944. R. ANSCHÜTZ 2,351,896
TYPEWRITING-CALCULATING MACHINE
Filed Nov. 21, 1938 9 Sheets-Sheet 1

R. Anschütz
Inventor

June 20, 1944.  R. ANSCHÜTZ  2,351,896
TYPEWRITING-CALCULATING MACHINE
Filed Nov. 21, 1938  9 Sheets-Sheet 3

R. Anschütz
Inventor
By Glascock Downing & Seebold
Attys.

June 20, 1944.  R. ANSCHÜTZ  2,351,896
TYPEWRITING-CALCULATING MACHINE
Filed Nov. 21, 1938  9 Sheets-Sheet 4
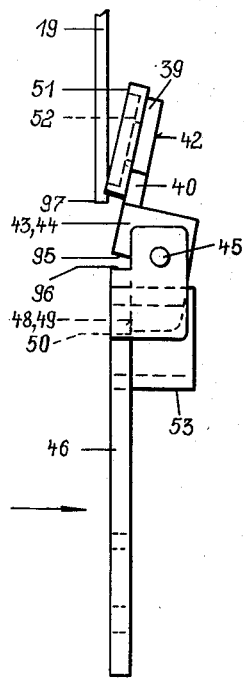
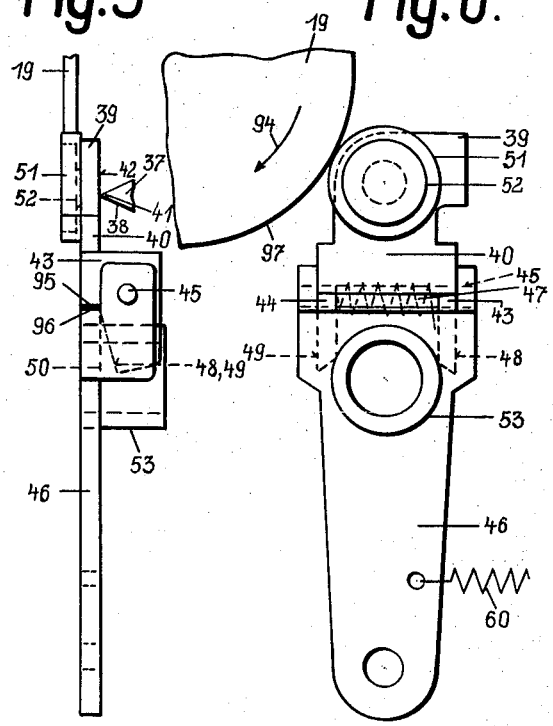
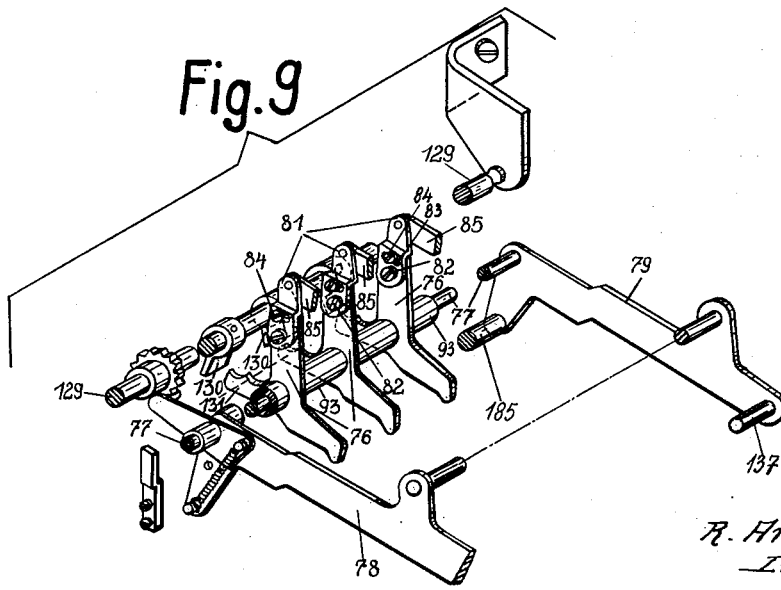

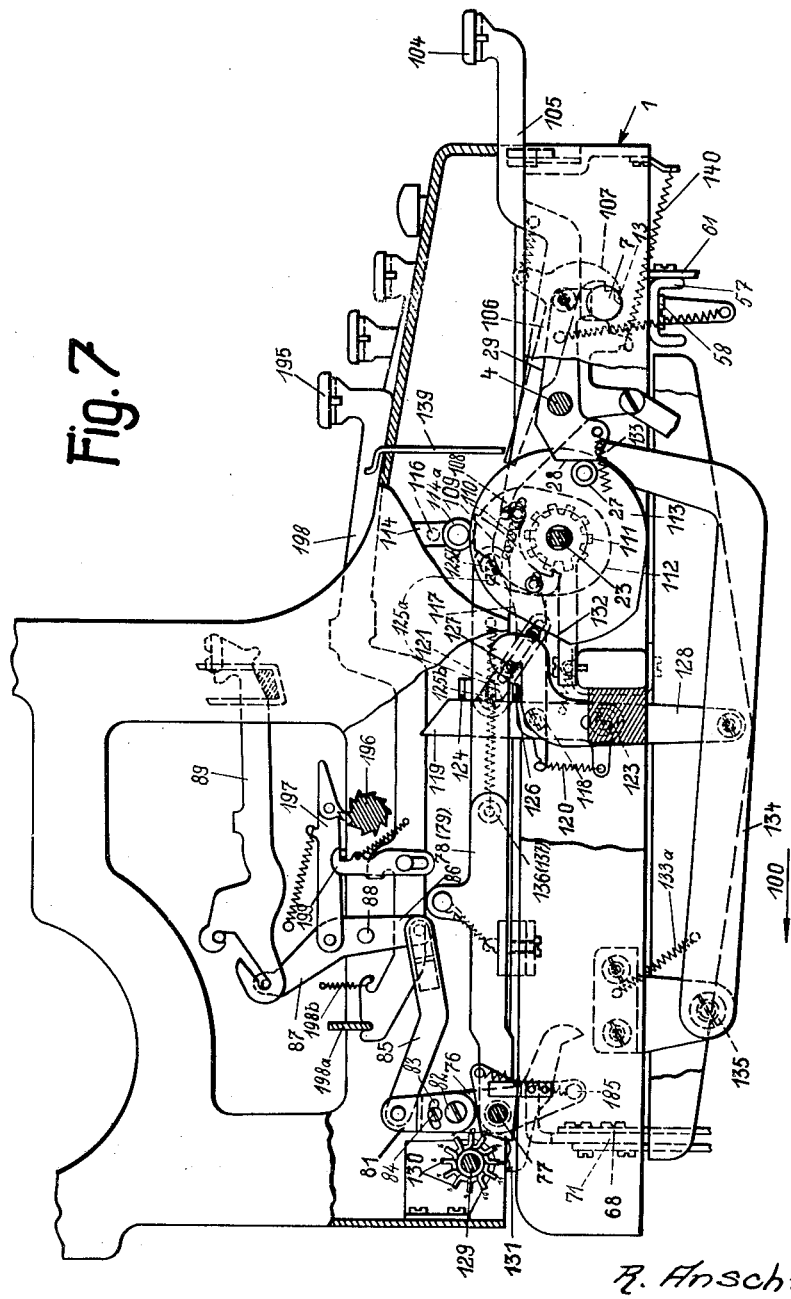

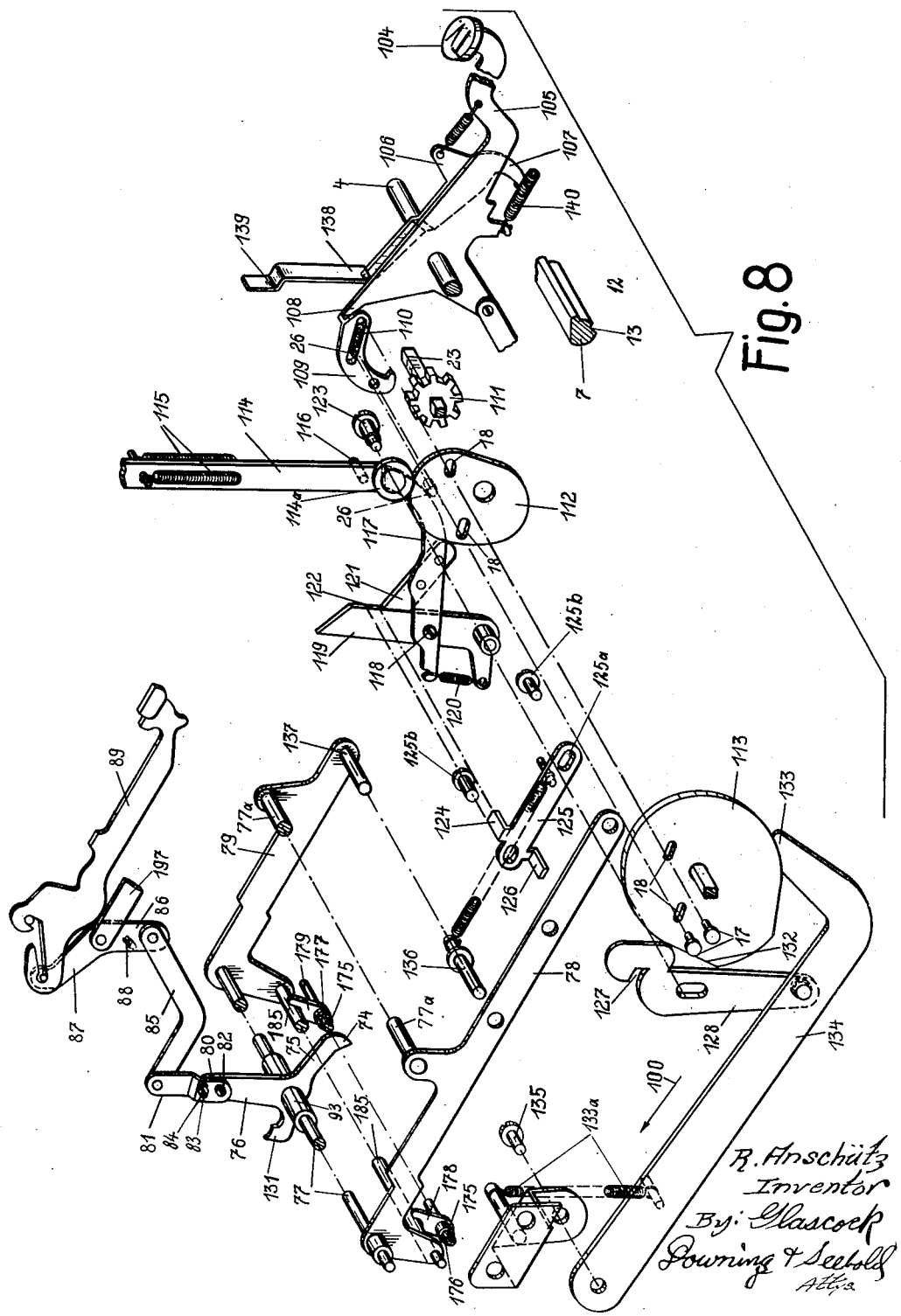

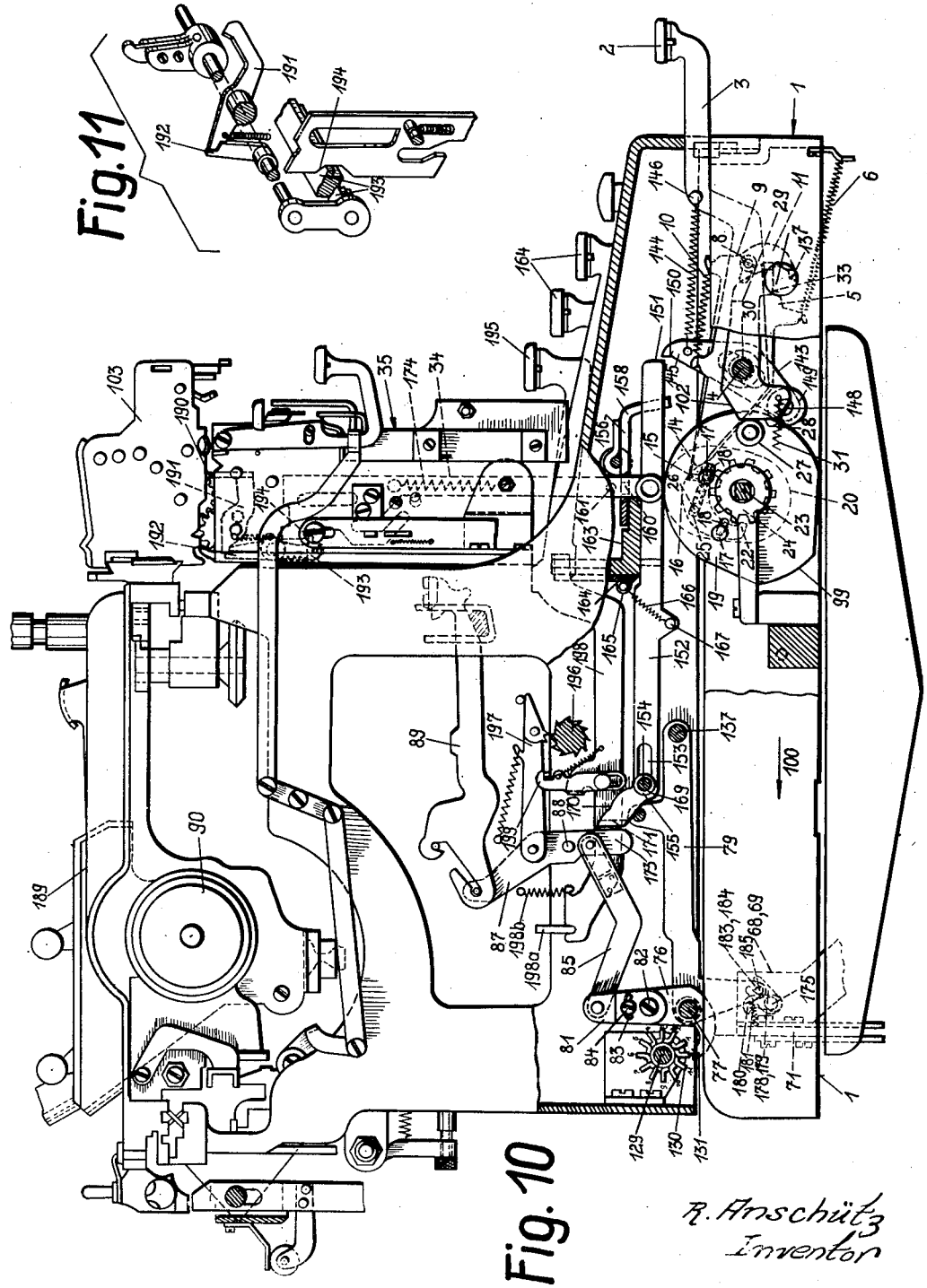

June 20, 1944.  R. ANSCHÜTZ  2,351,896
TYPEWRITING-CALCULATING MACHINE
Filed Nov. 21, 1938  9 Sheets-Sheet 8

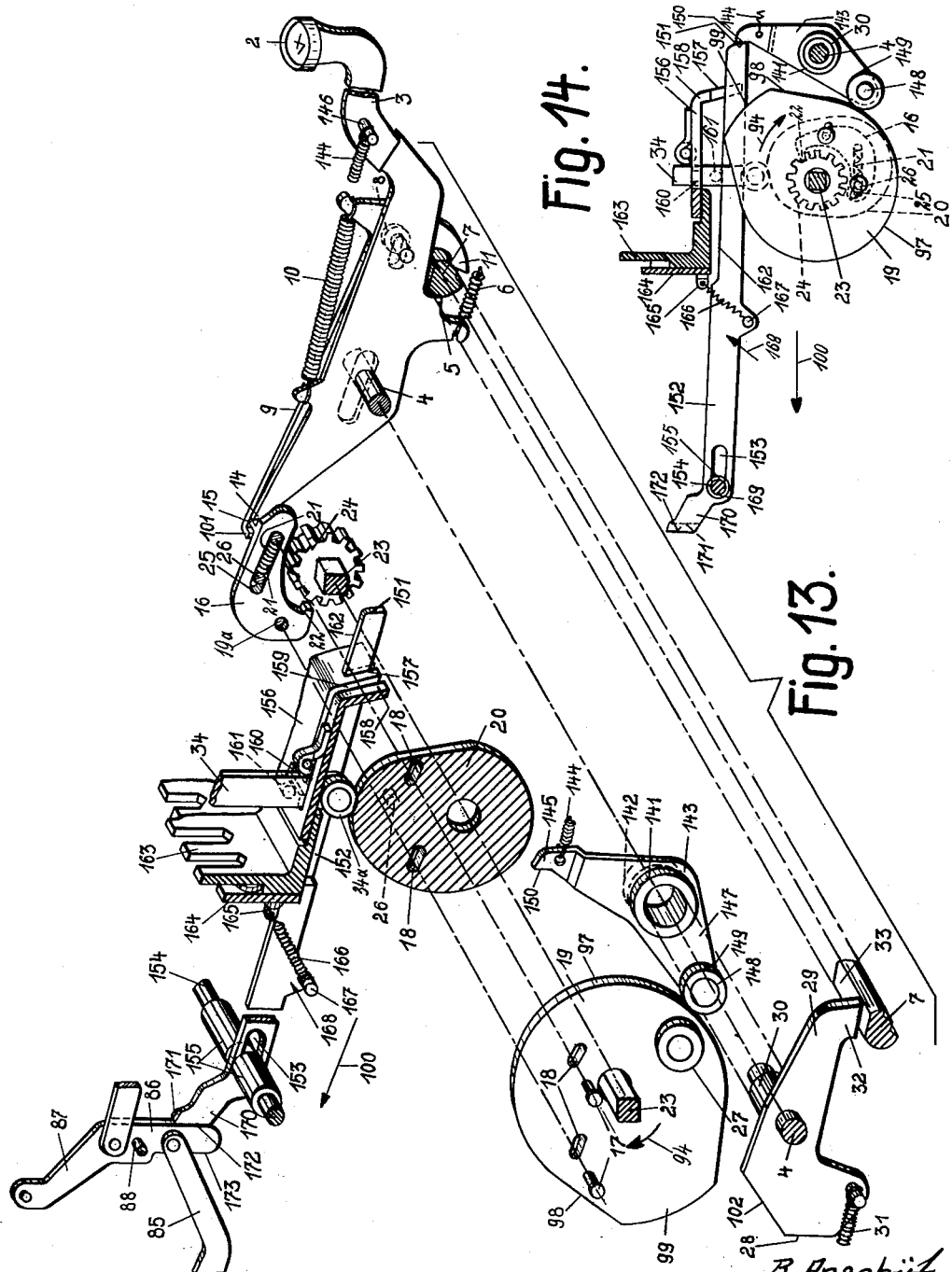

Patented June 20, 1944

2,351,896

UNITED STATES PATENT OFFICE 2,351,896

TYPEWRITING-CALCULATING MACHINE

Robert Anschütz, Zella-Mehlis, Germany; vested in the Alien Property Custodian

Application November 21, 1938, Serial No. 241,672
In Germany December 1, 1937

7 Claims. (Cl. 235—59)

This invention relates to typewriting calculating machines, booking machines, and similar machines, with separate sets of number typing and calculating keys, a typewriting mechanism and a calculating mechanism, a drive for the typewriting mechanism, and a drive for the calculating mechanism. The expression "calculating mechanism" is intended to include the total taking mechanism which is associated with the calculating mechanism.

In machines of this class, as designed heretofore, the typewriting mechanism is connected to its drive through the medium of the totalizing slides forming part of the calculating mechanism. Obviously, the condition for satisfactory operation is exact synchronisation of the drive for the typewriting and of the drive for the calculating mechanism, but, notwithstanding the utmost care in this respect, it would happen that when a value was introduced or a total was taken, the typewriting mechanism was not connected to its drive at the proper time, and so the value, or total, as the case might be, was not typed. On the other hand, the machine requires a separate set of typing keys in addition to the set of calculating keys, as it is necessary that numbers should be typed independently of the calculating and total taking operations, and so it is not feasible to effect such independent typing of the numbers through the drive for the calculating mechanism.

This difficulty is eliminated, and failure through lack of synchronism is prevented, according to the present invention, by arranging the typewriting mechanism so as to be connected to its own drive by the number typing keys, and to the drive for the calculating mechanism by the calculating keys.

By these means, it is possible, on the one hand, to operate the typewriting mechanism independently of the calculating mechanism and, on the other hand, to operate it through the drive for the calculating mechanism independently of its own drive, when a value is introduced in the calculating mechanism.

In the drawings,

Figs. 1 to 9 illustrate the first, and Figs. 10 to 14 illustrate the second or modified constructional example.

Fig. 1 is a partly sectioned elevation of the machine, viewed from its left-hand side.

Fig. 2 is a partial elevation of the machine, viewed as in Fig. 1 but showing principally the parts involved in the calculating operation.

Fig. 3 is a perspective illustration of the parts shown in elevation in Fig. 2.

Figs. 4 and 5 are end elevations, viewed from the front of the machine, of a link in the transmission mechanism from the drive of the calculating mechanism to the typewriting mechanism, in the inactive and active position of the link, respectively.

Fig. 6 is a side elevation of the link, viewed in the direction of the arrow in Fig. 4.

Fig. 7 is an elevation which is similar to Fig. 2 but shows principally the parts involved in total taking.

Fig. 8 is a perspective illustration of the parts shown in elevation in Fig. 7.

Fig. 9 is a perspective illustration of a swinging frame forming part of the said transmission mechanism.

Fig. 10 is a partly sectioned side elevation of the machine embodying the modification of the invention.

Fig. 11 is a perspective illustration of a detail of Fig. 10.

Fig. 12 is a plan view of the mechanism in the lower frame of the machine.

Fig. 13 is a perspective illustration of certain parts shown in elevation in Fig. 10.

Fig. 14 shows in elevation a detail of Fig. 13.

GENERAL DESCRIPTION OF THE MACHINE

Figure 1:
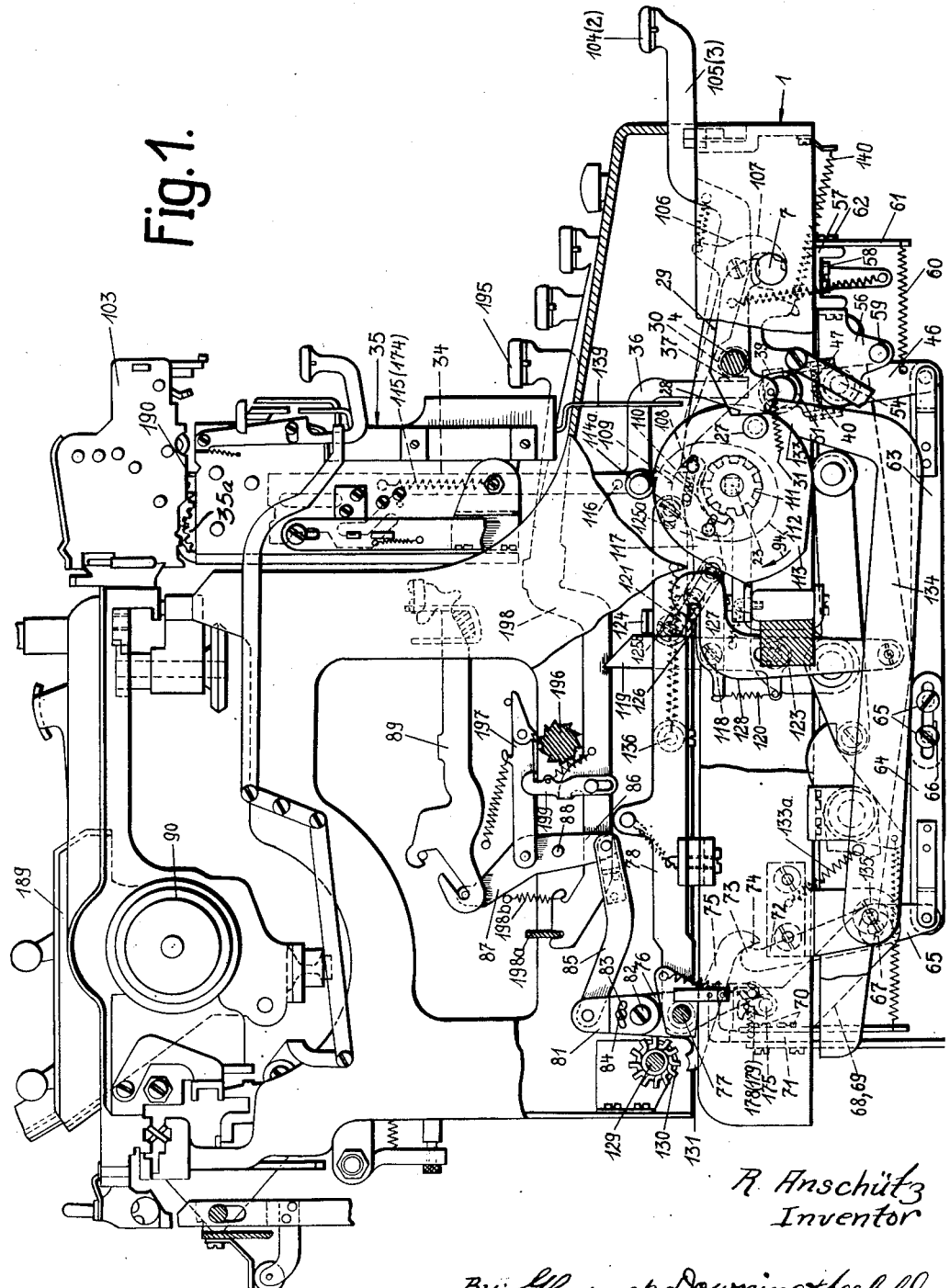

The machine is provided with a lower frame 1 and with a detachable upper frame, of a typewriter, placed on the frame 1. The calculating keys 2 are on bars 3 fulcrumed on a transverse rod 4 in the bearing frame 1 on which rod 4 the total taking key 104, 105 is fulcrumed near the left-hand side of the bearing frame 1. The bearing frame 1 also supports the driving shaft 23 for the calculating control mechanism which is arranged in a casing 35 on the front plate of the upper frame and includes the usual totalizer actuating master wheel 35a, Fig. 1, for the totalizers 103. A set of number typing keys 195 have key bars 198 notched to swing about the lower edge of a transverse bar 198a, in the upper frame, against which they are held by springs 198b. The type levers 89 of the typewriting mechanism are also arranged in the upper frame, together with a serrated driving shaft 196 for the typewriting mechanism. The usual paper carriage 189 and the totalizers 103 are mounted to slide on the top of the upper frame. A motor and reduction gearing, not shown, may be provided for rotating the driving shafts 23 and 196.

I. The arrangement of the parts involved in the calculating operation of the first constructional example In the following, that calculating key 2 which bears the number "4," and the parts and mechanisms allotted to this key, will be described, it being understood that the other nine keys, and the parts and mechanisms allotted to them, are similar.

Figure 3:
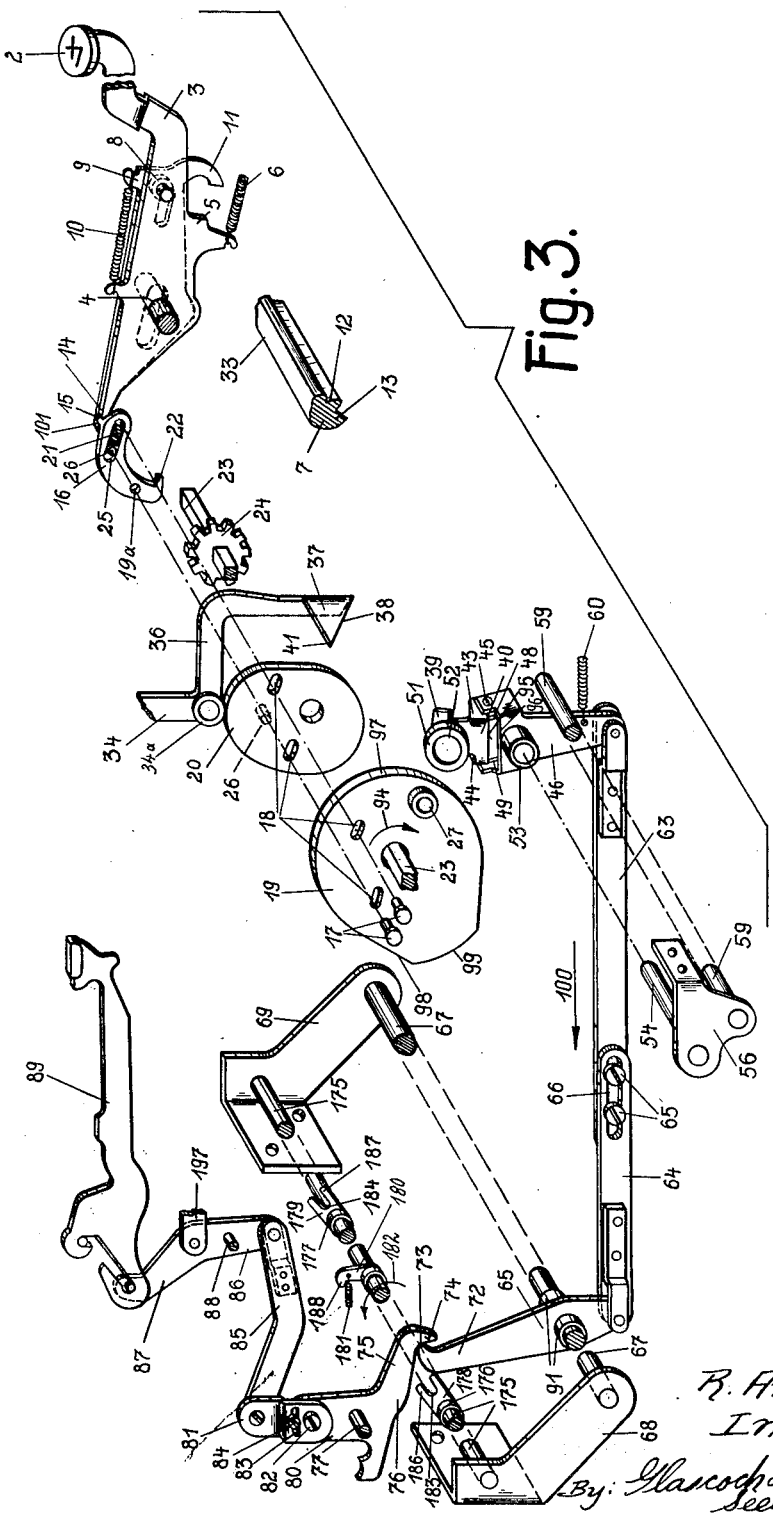

Each calculating key bar 3, as shown for the "4" key bar in Fig. 3, has a shoulder 5 which in the normal position of the key bar 3 is held by a spring 6 against the rear side of a locking bar 7 secured in the bearing frame 1. A pawl 8 is arranged at the right-hand side of each key bar 3 and slotted for sliding on the rod 4 and on a headed screw 9 secured in the key bar. The pawl has a locking tooth 11 which a spring 10 holds against a step 12 in the front side of the locking bar 7. When the "4" key is depressed, the tooth 11 engages in a groove 13 in the lower side of the locking bar 7, and holds the key in its depressed position.

The tail end 14 of each key bar 3 is arranged to cooperate with a projection 15 on a coupling member 16 mounted to slide on a cam unit 19, 20. One such unit 19, 20 is allotted to each key bar 3, and located on the driving shaft 23. The driving shaft 23 is of square cross-section for accommodating square holes in the bosses of coupling pinions 24 allotted to the individual cam units 19, 20. The arrangement may be such that rotation of the shaft 23 is not interfered with when the cam units are arrested.

The coupling member 16 is mounted to slide on its cam unit 19, 20 by a pair of rivets 17. In Fig. 3, certain parts are shown at a distance from the members to which they are connected, for the sake of clearness. Thus, the two rivets 17 are shown to the left of the cam 19 while in fact the rivet at the left is inserted in a hole 19a in the coupling member 16, and the rivet at the right is fixed in the front end of a longitudinal slot 25 in the coupling member 16. The rivets 17 extend through slots 18 in the cams 19 and 20. A pin 26 on the cam 20 projects into the slot 25, and a spring 21 in the slot is inserted between the rivets 17 at the right, and the pin 26. The spring 21 holds the projection 15, of member 16, against the tail end 14 of the calculating key bar 3 and in this position a tooth 22 on the member 16 is out of mesh with the teeth of the corresponding pinion 24 on the shaft 23. The shaft 23 rotates clockwise in the direction indicated by the arrow 94. The reaction of the spring 21 against the pin 26 exerts a torque in anti-clockwise direction on the cam unit 19, 20 whose cams 19, 20 are rigidly connected. At this time the unit is free on the shaft 23, as described. This torque is opposed by a roller 27 on the cam 19 bearing against an edge 28, Fig. 2, of a catch 29, and the cam unit 19, 20 is therefore held in its normal position.

The catch 29, as best seen in Fig. 13, is fulcrumed on rod 4, with its boss 30, and a spring 31 turns the catch clockwise and holds its tail end 32 against the flattened top 33 of the locking bar 7 in the initial position of the catch 29. An incline 102 is arranged on the upper side of the catch 29 adjacent the edge 28.

Figure 2:
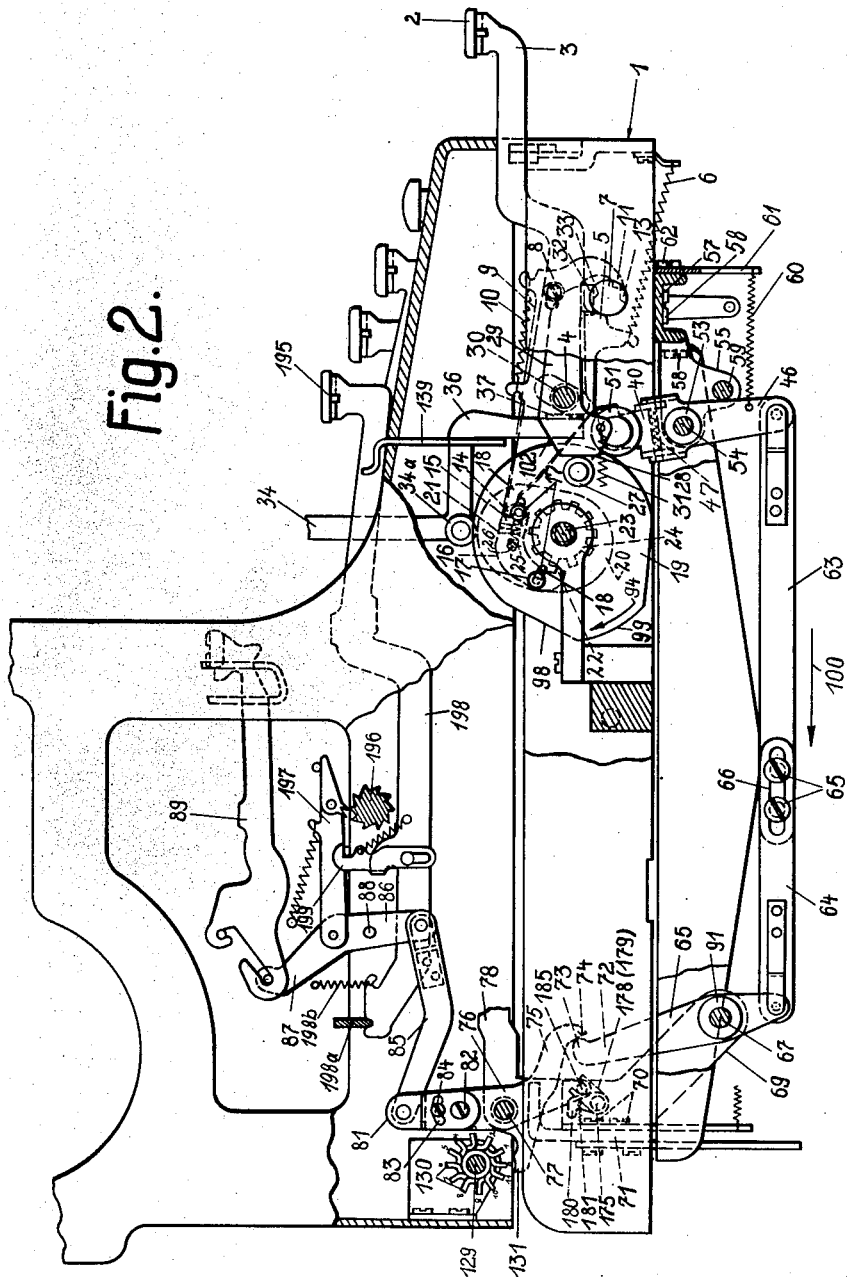

The cams 20 cooperate with totalizing slides 34, Figs. 1 and 2, forming part of the calculating mechanism in the casing 35. A roller 34a at the lower end of each slide 34 is held against the edge of the corresponding cam 20 by springs 174. An arm 36 extends forwardly and downwardly from each totalizing slide 34 at its lower end, and a wedge 37 extends to the left at right angles from the lower end of the arm. The lower edge 38 of the wedge 37 is arranged to strike a lug 39, Figs. 3 to 6, on a U-shaped tilting member 40 whose shanks 43 and 44 are pivoted on a pin 45 secured in the U-shaped upper portion of a link 46. This link 46 is fulcrumed on a rod 54 with its boss 53. The rod 54 is supported by a pair of brackets 55 and 56 which are secured to a channel-section transverse bar 57, Fig. 2, by screws 58. A spring 60 tends to turn each link 46 anti-clockwise about the rod 54 and this movement is limited by a shaft 59 in the brackets 55 and 56. The other ends of the springs are connected to a comb-shaped bar 61, Fig. 2, which is connected to the bar 57 by screws 62.

A torsion spring 47, Fig. 6, on the pivot 45 turns the tilting member 40 clockwise about such pivot 45, as viewed in Fig. 4, until the edges 48 and 49 of the shanks 43 and 44 bear against the right-hand side 50 of the link 46. This is the normal position of the tilting member 40. A roller 51 may rotate about a rivet 52 on the tilting member 40, and when the totalizing slide 34 descends and the lower edge 38 of the wedge 37 strikes the lug 39 of the tilting member 40, the member 40 is moved into the position in Fig. 5 which is its active position and in which its roller 51 is in line with the cam 19. In the active position of the tilting member 40, a point 41 on the wedge 37 at the lower end of the arm 36 bears against the right-hand side 42 of the tilting member 40, holding the member in its active position against the reaction of the torsion spring 47.

Pivoted to the lower end of each link 46 is one part 63 of a two-part connecting rod whose other part 64 is pivotally connected to the lower end of a swinging lever 65. The parts 63 and 64 of the connecting rod are slotted at 66 for adjusting the effective length of the connecting rod, and clamping screws 65a are provided for holding the parts in adjusted position. The swinging levers 65 may swing about a rod 67, Fig. 3, which is supported at its ends by bearing brackets 68 and 69, the brackets 68, 69 being secured to a transverse plate 71, Fig. 2, at the rear of the bearing frame 1 by screws 70.

Each lever 65 has an arm 72 with a cam 73 for cooperation with an incline 74 at the end of an arm 75 on a three-armed lever 76. The three-armed levers 76 are mounted to swing about a shaft 77, Figs. 8 and 9, of a swinging frame having a pair of parallel frame members 78 and 79, a shaft 185 just below the shaft 77, a central stay 77a at the top of the frame, a journal 136 in the frame member 78, and a journal 137 in the front end of the frame member 79.

On the upwardly projecting arm 80 of each three-armed lever 76 an extension 81 is pivotally arranged about a screw 82. By means of an arcuate slot 83, Fig. 1, and a headed screw 84 inserted in the arm 80 the angular position of the extension 81 with respect to the arm 80 can be varied. The upper end of the extension 81 is connected to the lower arm 86 of a lever 87 by a link 85. The lever 87 is fulcrumed at 88 and its upper arm is operatively connected to a type lever 89 which is thrown against the platen in the carriage 90 when the lever 87, is turned clockwise. A hook 191, Fig. 1, is pivoted to the lever 87 at one end and with its free end is arranged to engage in one of the serrations of the driving shaft 196. When a number typing key 198 is depressed, the spring-controlled rod 199 is pulled to engage the hook 197, with shaft 196 so that the lever 87 is turned clockwise, and the type lever 89 is operated.

It is understood that the parts which have been described with reference to the calculating key 2 for the number "4," and its key bar 3, are also provided for the calculating keys 2 and their key bars 3 which bear the numbers "0" to "3," and "5" to "9."

The links 46 and the swinging levers 65 are spaced on the respective rods 54 and 67 by spacing sleeves as exemplified in Fig. 9 which shows spacers 93 for the three-armed levers 76, on the shaft 77.

II. The calculating operation

When, for calculating, for instance, the number "4" in the calculating mechanism, the calculating key 2 for the number "4" and pawl 9 are depressed, its key bar 3 is turned clockwise about the rod 4, whereby tooth 11 slides off the step 12 and under the action of the spring 10 engages in the groove 13 in the locking bar 7 to hold the key bar 3 in its depressed position. When the key bar 3 is depressed, its tail end 14 releases the projection 15 on the coupling member 16, and the spring 21 throws the tooth 22 between the teeth of the pinion 24. The cams 19 and 20 now rotate with the continuously rotating driving shaft 23 in the direction of arrow 94. The corresponding totalizing slide 34, under the action of its spring 174 descends from the elevated portion of the rotating cam 20 to its depressed position. In this movement the totalizing slide 34, acts through the inclined edge 38 of the wedge 37 at the lower end of its arm 36, to engage the lug 39 of the tilting member 40 on the link 46, and turn this member 40 anti-clockwise against the action of the torsion spring 47, until the edge 95 of the tilting member 40 bears against the edge 96 of the link 46, Fig. 5. When the edges 95 and 96 meet, the edge 38 of the wedge 37 has moved off the lug 39 of the tilting member 40. The point 41 of the wedge 37 now bears against the side 42 of the lug 39 and holds the tilting member 40 in its active position with respect to the cam 19. The roller 51 of the tilting member 40 is now engaged by the edge 97 of the cam 19 but the link 46 is not immediately operated as the lower dwell portion of the cam 19 now moves past the roller 51. However, when the cam 19 has performed about one-half of a revolution, the ascending edge 98 of the cam which leads to its elevated portion 99, begins to bear against the roller 51 on the tilting member 40 and, upon further rotation of the cam 19, turns the tilting member 40 together with the link 46 clockwise about the rod 54 against the spring 60. The connecting rod 63, 64 is thereby moved in the direction of the arrow 100 in Fig. 3, the lever 65 is turned clockwise about the rod 67, and its cam 73 acts on the incline 74 of the arm 75 of the three-armed lever 76. This is a one-way connection since 73 acts on 74 only when the lever 65 turns clockwise. The three-armed lever 76 is thereby turned anticlockwise about the shaft 77 in the swinging frame 78, 79, the connecting rod 85 is moved in the direction of the arrow 100 and the lever 87 is turned clockwise about its fulcrum 88, and the type lever 89 for the number "4" is thrown against the platen 90 in the carriage 189.

When the type lever 89 has performed its stroke, the cam 19 has rotated so far as to move its elevated portion 99 away from the roller 51. Consequently, the link 46 and its tilting member 40 return into their initial position under the pull of the spring 60, turning anti-clockwise about the rod 54 until the link 46 bears against the shaft 59. When the link 46 returns into the initial position, as shown in Fig. 2, the lever 65 is turned anti-clockwise about the rod 67 by the connecting rod 63, 64, and assumes the position in Fig. 2. The projection 73 of its arm 72 releases the incline 74 of the lever 76, and the lever 76, with its extension 81, the connecting rod 85, and the lever 87 return to their initial positions, Fig. 2, under the action of the type lever 89 which returns by gravity.

Upon further rotation of the cam unit 19, 20 in the direction of arrow 94 the elevated portion of the cam 20 elevates the totalizing slide 34 through its roller 34a against the action of spring 174. The point 41 of the wedge 37 on the arm 36 of the totalizing slide 34 in consequence releases the lug 39 of the tilting member 40 and this member, under the action of the torsion spring 47, turns clockwise, as viewed in Fig. 5, about its pivots 45 and back into the inactive position Fig. 4, in which the edges 48 and 49 of the shanks 43 and 44 of the U-shaped member 40 bear against the side 50 of the link 46 and the roller 51 on the tilting member 40 is placed beyond reach of the cam 19.

A short time before the cam unit 19, 20 and the coupling member 16 have completed their revolution, the projection 15 of the member 16 acts on a portion 101 of the pawl 9 which is in the path of the projection, 15, and shifts the pawl to the front against the spring 10. The tooth 11 of the pawl 9 leaves the groove 13 in the locking bar 7 and the spring 6 returns the calculating key bar 3 and the pawl 9 into their normal positions, as shown in Figs. 2 and 3 in which the tail end 14 of the calculating key bar 3 is again in the path of the projection 15 of the coupling member 16.

At the same time, the roller 27 on the cam 19 acts on the incline 102 of the catch 29, turning the catch 29 anti-clockwise about the rod 4 against the spring 31 in order to pass said catch. Just before the cam unit 19, 20 has completed its revolution the projection 15 of the coupling member 16 strikes the tail end 14 of the restored calculating key bar 3 and this causes the tooth 22 of the coupling member to be moved clear of the pinion 24 against the spring 21, and the rotation of the cam unit 19, 20 is now interrupted. When the roller 27 on the cam 19 has left the incline 102 of the catch 29, the spring 31 returns the catch 29 into its initial position, Fig. 2, the roller 27 is wedged against the edge 28 of the catch 29, and the cam unit 19, 20 and the coupling member 16 are held in their normal position.

III. Total taking

Assume that one of the column totalizers 103 indicates, in any decimal place, the number "4". This value "4" is to be typed upon depression of the total taking key 104, Figs. 7 and 8 and the total taking operation started thereby.

When the total taking key 104, Fig. 8, is depressed, its key bar 105 turns clockwise about the rod 4, and a pawl 106 which is fulcrumed on the key bar 105, partakes in this movement. The tooth 107 of the pawl 106 leaves the step 12 and snaps into the groove 13 of the locking bar 7, thereby holding the total taking key 104 in its depressed position.

When the key bar 105 is depressed, its tail end 108 moves from and thereby releases a coupling member 109 which is arranged on the cam unit 113, 112 of the total taking mechanism in a manner similar to the arrangement described with reference to the cam unit 19, 20 of the calculating mechanism. The spring 110 of the coupling member 109 now moves the member into engagement with a coupling pinion 111 on the driving shaft 23, which, it will be remembered, rotates continuously, in the direction of the arrow 94. The cam unit 113, 112 is thereby coupled to the shaft 23.

When the cam unit 113, 112 begins to rotate in the direction of the arrow 94, a roller 114a at the lower end of an unlocking slide 114—which is only partly shown in Figs. 7 and 8—descends on the descending portion of the cam 112 under the action of springs 115. A pin 116 on the descending unlocking slide 114 acts on a lever 117 which is fulcrumed on a headed screw 118 on a bellcrank 119. A spring 120 which connects the rear end of the lever 117 to the shorter arm of the bellcrank 119 tends to turn the lever 117 anticlockwise so that an abutment 121 on the lever 117 bears against the front edge 122 of the bellcrank 119. When the pin 116 on the unlocking slide 114 acts on the lever 117, the lever 117 and the bellcrank 119 are turned clockwise about a headed fulcrum screw 123 for the bellcrank 119. The front edge 122 of the bellcrank 119 acts on a lug 124 of a slide 125 having slots 125a by which it is guided on headed screws 125b supported by the member 78 of the swinging frame. A spring attached to the journal 136 pulls the slide 125 to the rear. The bellcrank 119 shifts the slide 125 forwardly, so that a lug 126 on the slide engages in a slot 127 in the upper end of a link 128 and thereby couples the link to the swinging frame 78, 79. At its lower end, the link is connected to a lever 134 whose front end 133 is held against the cam 113 by a spring 133a.

During the zero setting, of a totalizer wheel, which occurs during rotation of the cam unit 113, 112 a selector cam shaft 129, Figs. 7 and 9, is rotated clockwise, under control of the totalizer wheel registering the number "4," all as fully disclosed in my co-pending application Serial No. 146,897, filed June 7, 1937, on which the present application is an improvement, to place that selector cam 130 which corresponds to the number "4" in line with the third arm 131 of the corresponding selectable member, or three-armed lever 76. Reference is also made to U. S. patents to Anschütz et al. 2,257,409, issued September 30, 1941, and to Anschütz, 2,286,887 issued June 16, 1942, applications for which were co-pending with the present application.

When upon further rotation of the cam unit 113, 112 in the direction of the arrow 94, the ascending portion 132, of the cam 113 acts on the end 133 of the lever 134 and turns the lever clockwise about its fulcrum screw 135. The link 128 partakes in this movement and, through its slot 127 and the lug 126 of the slide 125, pulls down the slide 125 and the swinging frame 77, 78, 79 is turned clockwise about its journals 136 and 137. Immediately upon the beginning of the movement of the swinging frame, and the raising of the shaft 77, with the three-armed levers 76 on the shaft, the third arm 131 of the lever 76, for the number "4", strikes the corresponding selector cam 130 on the shaft 129. This causes the lever 76 to turn about the shaft 77 as the swinging frame moves further, in anti-clockwise direction, so that the extension 81 of the lever 76 pulls the connecting rod 85 which is pivoted to the extension 81, in the direction of the arrow 100, Fig. 8. The connecting rod 85 swings the lever 87 for the "4" type lever 89 clockwise about the fulcrum 88 to print the number "4."

When the cam unit 113, 112 rotates further, the elevated portion of the cam 113 releases the end 133 of the feeler 134, so that the feeler 134 and the swinging frame 77, 78, 79 are free to return into their initial positions, as shown in Fig. 7. Similarly, the elevated portion of the cam 112 raises the unlocking slide 114 and the pin 116 of the slide releases the lever 117 and breaks the connection between the lug 126 on the slide 125 and the slot 127 in the link 128. When the cam unit 113, 112 has almost completed its revolution, the end 138 of a slide 139 in Figs. 7 and 8, descends and turns the pawl 106 anti-clockwise so that the pawl tooth 107 leaves the groove 13 in the locking bar 7, and consequently the total taking key bar 105 of the total taking key 104, together with the pawl 106, returns into its initial position, Fig. 7, under the action of the spring 140. When the key bar 105 is in its initial position, the coupling member 109, after a complete revolution of the cam unit 113, 112, bears against the tail end 108 of the key bar, and the cam unit 113, 112 is uncoupled from the continuously rotating driving shaft 23.

In the meantime, the selector cam shaft 129 will have been rotated back to its initial position, so that now all parts are in their initial positions, as shown in Fig. 7.

*IV. Modification*

The arrangement and operation of the parts of the second constructional example will now be described with reference to Figs. 10 to 14.

Figure 12:
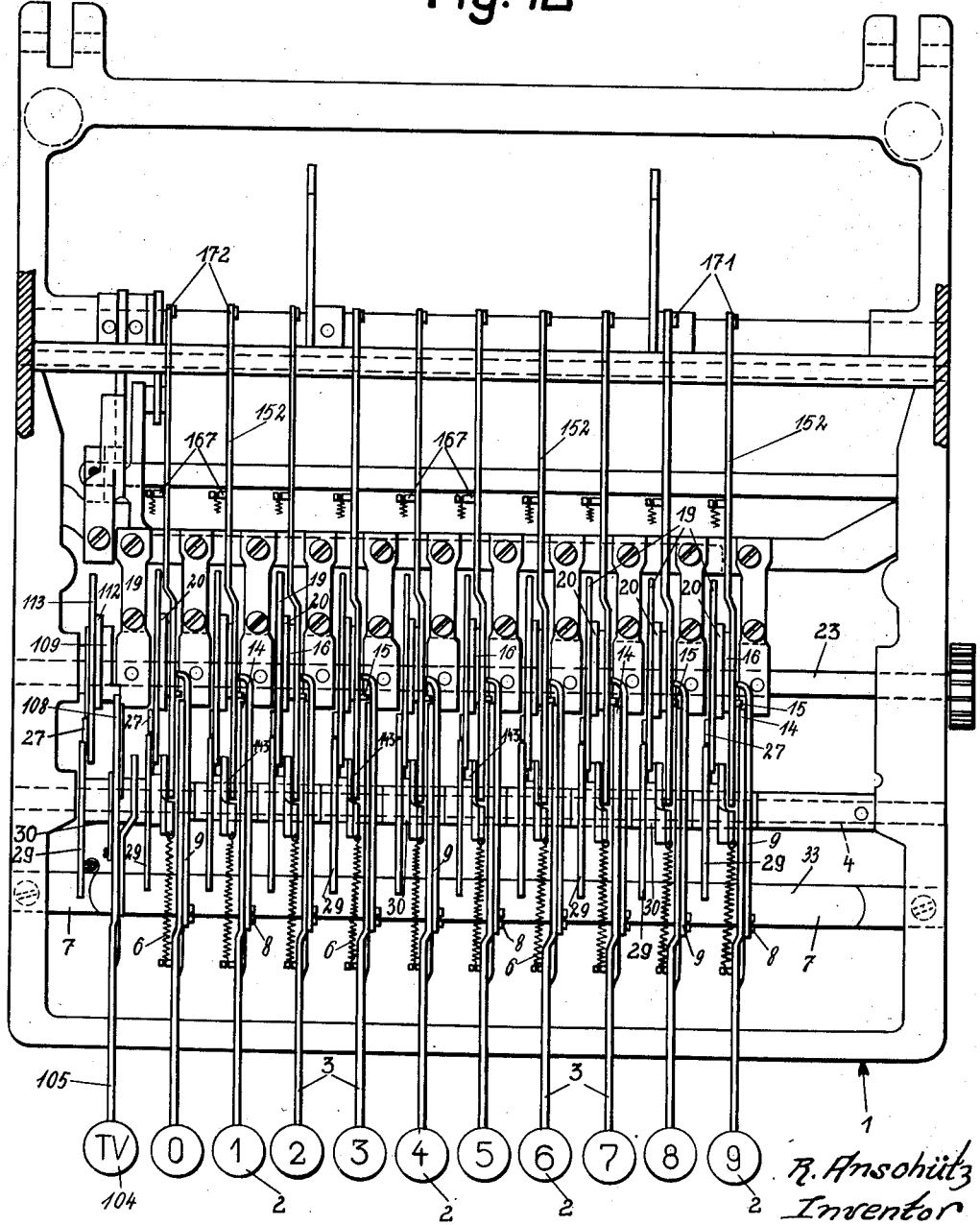

The cam units 19, 20, the key bars 3 of the calculating keys 2, the coupling member 16, and the pinion 24 as shown in Fig. 12, are similar to those illustrated in Fig. 3, and will not be described again. As in the previous example, the parts are alike for all calculating keys and therefore only the parts corresponding to the number "4" will be described.

The catch 29 for the calculating key bar 3 for the number "4," Fig. 12, is fulcrumed on rod 4 with its boss 30, as described. Mounted to swing on the boss 30 by bosses 141 and 142 is a lever 143. The bosses 141 and 142 space the calculating key bar 3 from the lever 143, and the lever 143 from the catch 29, so that the lever 143 is held against lateral displacement, as shown in Fig. 12. A spring 144, Fig. 13, attached to the upper end 145 of the lever 143—the end being kinked to the right—and to a pin 146 on the calculating key bar 3, urges the link 143 clockwise about the shaft 4 so that a roller 149 on a rivet 148 at the lower end 147 of the lever 143 bears against the edge of the cam 19.

The kinked upper end of the lever 143 has a rear edge 150 for engaging the front end 151 of a push rod 152. In the initial position of the parts, as shown in Figs. 10 and 13, the push rod 152 is raised so that its front end 151 clears the edge 150 of the lever 143. The push rod 152 is slotted near its rear end at 153 to slide on, and to swing about, a rod 154 secured in the upper frame of the machine. The rear ends 151 of the push rods 152 are guided between spacing sleeves 155 on the rod 154. The front ends of the push rods are guided in slots 157 of a comb 156. The comb 156 is provided for this purpose with a downwardly inclined rib 158. At the side of the slot 157, a long slot 159 is made in the comb 156 for the reception of the totalizing slide 34 for the number "4," and at its right-hand side is a recess 160 for a pin 161 to pass as the slide descends under the control of its springs 174 and the cam 20, as described above. The pin 161 is arranged to bear against the upper edge 162 of the push rod 152.

The comb 156 for guiding the totalizing slides 34 and the push rods 152 is connected to a bar 163 for the roller lock of the key bars of the number typing keys 195. The bar is secured in the upper frame of the machine. A strip 164 Figs. 13 and 14, has eyes 165 for springs 166 each of which is connected to a pin 167 on the corresponding push rod 152. The spring 166 urges the push rod 152 in upward and forward direction, as indicated by the arrow 168 in Fig. 13, and the rear end 169 of the slot 153 bears against the rod 154, defining the initial position of the push rod 152.

At its rear end, the push rod has an upwardly directed portion 170 and the rear end of this portion is reinforced by a plate 171 for widening the rear edge 172 of the push rod 152. This rear edge 172 is arranged to cooperate with a downward extension 173 on the lower arm 86 of the lever 87 which is operatively connected to the type lever 89 for the numbr "4." As mentioned, parts such as have been described, are allotted also to the other calculating keys 2 from "0" to "3," and from "5" to "9."

V. The calculating operation

When, for calculating, by way of example, the value "4," the calculating key 2 corresponding to the number "4" is depressed, and its key bar 3 swung, the cam unit 19, 20 is coupled with the shaft 23 for a full revolution in the direction of the arrow 94, in the manner described in Section II. The corresponding totalizing slide 34 descends on the descending portion of the cam 20 under the action of its spring 174. When the totalizing slide 34 descends its pin 161 moves through the recess 160 in the totalizing slide guiding comb 156, engages the upper edge 162 of the pushrod 152 and swings the rod clockwise about the rod 154 against the spring 166. This, as shown in Fig. 14, places the front end 151 of the push rod 152 to the path of the edge 150 on the lever 143.

At the beginning of the revolution of the cam unit, 19, 20, the cam 19 moves along the roller 149 of the lever 143 with its dwell edge 97 without moving the lever 143 and upon further rotation in the direction of the arrow 94 the configuration of the cam 20 allows the totalizing slide 34 to remain in the position illustrated in Fig. 14, so that the pin 161 holds the pushrod 152 down and its front end 151 remains in the path of the edge 150 of the lever 143. Later, the ascending edge 98 of the cam 19, through the roller 149 swings the lever 143 about the shaft 4 in anti-clockwise direction. The push rod 152 is thus moved in the direction of the arrow 100, Fig. 13, against the spring 166, its rear edge 172 acts on the extension 173 of the arm 86 on the lever 87, and swings it clockwise about the fulcrum 88 to swing the type lever 89, which corresponds to the number "4," to the platen 90 on the paper carriage 189.

As described with reference to the first constructional example, the other parts which are operatively connected to the lever 87 are involved when the push rod 152 is pushed back in the direction of the arrow 100, and the clockwise swinging of the lever 87 is caused thereby. Such parts are the connecting rod 85, the extension 81, and the selectable member 76, Fig. 10, which, in this instance, is without the arm 75 in the first constructional example. This movement of the member 76, however, does not produce any effect.

When the number "4" has been typed by the type lever 89, the cam unit 19 and 20 has rotated so far that the roller 149 of the lever 143 will have been passed by the elevated portion 99 of the cam 19 and will follow the drop of said cam so that lever 143 under the pull of its spring 144, is returned clockwise to its initial position, as shown in Fig. 10, in which the roller 149 of the link 143 is again on the edge 97 of the cam 19.

When the lever 143 returns to the initial position in Fig. 10, its edge 150 releases the front end 151 of the push rod 152 and the spring 166 moves the push rod forward against the arrow direction 100, until the end 169 of its slot 153 bears against the rod 154. The rear edge 172 of the forwardly moving push rod 152 releases the extension 173 of lever 87 and the type lever 89, returning by gravity, moves the lever 87 into the initial position shown in Fig. 10.

As the cams 19 and 20 rotate further, the elevated portion of the cam 20, through the roller 34a of the totalizing slide 34, raises this slide against the action of its spring 174. The pin 161 of the rising totalizing slide 34 recedes from the upper edge 162 of the push rod 152 and the spring 166, acting in the direction of the arrow 168, turns the push rod 152 anti-clockwise about the rod 154 and to the normal position shown in Fig. 10, in which the upper edge 162 of the push rod 152 is arrested by the upper end of the guiding slot 157.

When the cams 19 and 20, and the coupling member 16, have performed a complete revolution, they are uncoupled from the continuously rotating shaft 23, as described in Section II, and the calculating key bar 3 returns into its normal position.

VI. Preventing distortion of the swinging frame

As described in Section III, the swinging frame 77, 78, 79 shown in Figs. 7, 8 and 9 is moved clockwise about its journals 136 and 137 upon rotation of the total taking cam 113 at the left of the machine, through the lever 134, the link 128, and the lug 126 of the slide 125. This produces one sides stress in the swinging frame, particularly when typing a number of higher order, i. e., "9" or some adjacent number. For instance, when the number "9" is typed, whose three-armed lever 76 is at the right-hand end of the shaft 77, and when the arm 131 of this member engages the selector cam 130 on the selector cam shaft 129 which corresponds to the number "9," at the beginning of the movement of the swinging frame, the frame member 79 is restrained at the right-hand side of the swinging frame while the frame member 78 at the left-hand side is free to move on, causing distortion of the frame. This is prevented by the following arrangement:

A shaft 175 is mounted to rotate in the bearing brackets 68 and 69, Fig. 3, which support the rod 67 for the swinging levers 65, and on the shaft 175 are secured the bosses 176, 177 of forks 178 and 179, and a check 180, with a projection 188 at its upper end. A spring 181 which is attached to the check 180 and to the transverse plate 71, Fig. 2, tends to turn the shaft 175 in the direction of the arrow 182, and to bring the projection 188 of the check against the plate 71. The slots 183 and 184 of the forks 178 and 179 engage the shaft 185 of the swinging frame in the normal position of the frame, Fig. 8. In this normal position of the frame, the forks are held inclined in forward direction, against the action of the spring 181. When the swinging frame is turned clockwise, as described in Section III, the left-hand end of the shaft 185 acts on the rear edge 186 of the fork 178 and turns the fork and the shaft 175 in the direction of the arrow 182, Fig. 3. The fork 179 engages the right-hand end of the shaft 185 with its front edge 187 and distortion of the swinging frame is prevented by this fork 179 acting on the right-hand end of the shaft 185. When the swinging frame has turned through a given angle in clockwise direction, the shaft 175 has turned in the direction of the arrow so far that the projection 188 of the check 180 engages the front face of the plate 71. The shaft 175 and the forks 178 and 179 are now arrested against moving in the direction of the arrow 182 and when the swinging frame turns further, the shaft leaves the slots 183 and 184 of the forks 178 and 179. After the shaft 185 has cleared the forks 178 and 179, the spring 181 keeps the projection 188 against the plate 71 and holds the shaft 175 with its forks 178 and 179 in position. When the swinging frame returns to its initial position, as shown in Fig. 7, its shaft 185 again engages in the slots 183 and 184 of the forks 178 and 179 and turns the forks 178 and 179, the shaft 175 and the check 180 against the spring 181 and against the arrow 182, to the normal position illustrated in Figs. 1, 2, and 3.

It will appear from the foregoing description that the connection between the cams 19 and the type levers 89 is interrupted in the nonculating condition of the machine, by the roller 51 on the tilting member 40 not being in active position, Fig. 4, or the push rod 152 being elevated, Fig. 10, beyond reach of the edge 150 on the lever 143. The purpose for which this arrangement is provided, will now be described.

Suppose that in any position of the paper carriage 189 none of the column totalizers 103 is in active position and that the operator depresses one of the calculating keys 2 by mistake. The corresponding totalizing slide 34 can not descend since no controlling plate 190, arranged on each totalizer 103 (Fig. 10), is in position to have moved the unlocking lever 191 (Figs. 10 and 11). Therefore the locking lever 192 is not released, the locking beam 193 does not swing out in the clockwise direction and the slide 34 which stops with its incline 194 upon the locking beam 193 is held in its normal position and does not descend. The cam unit 19, 20 allotted to the calculating key which has been depressed by mistake, is coupled to, and rotates with, the driving shaft 23, but, since the totalizing slide 34 does not descend, its wedge 37, Figs. 3 and 5, cannot move the member 40 into active position. Nor, in the modification, Fig. 10, can the edge 150 of the lever 143 act on the end 151 of the push rod 152. In both cases, the corresponding type lever 89 is not operated. Consequently, if a calculating key 2 is operated while no totalizer is at a computing zone of the carriage travel the value will not be calculated and will not be typed.

As described, when numbers are typed by operating the number typing keys 195 from "0" to "9," the type levers 89 are operated by the usual power drive, that is from the serrated or cam shaft 196 rotating clockwise continuously. Depression of a key 195 connects the hook 197 to the shaft 196 through key bar 198 and member 199, the lever 87 is turned clockwise and the type lever 89 is thrown against the platen 90. Thus, while upon operation of the calculating keys 2 and the total taking key 104 the type levers 89 are under the control of the driving shaft 23 for the calculating mechanism they are under the control of the shaft 196 when the number typing keys 195 are operated.

It is understood that the expression "total taking" in the foregoing description and in the claims is intended to include total taking and also subtotal taking.

Having now particularly described and ascertained the nature of my said invention and in what manner the same is to be performed, I declare that what I claim is:

1. In a combined typewriting and computing machine having a letter-feedable carriage, a master-wheel and a set of totalizer-wheels engageable seriatim with said master-wheel by means of said carriage; the combination of a numeral-value type; a numeral-value key; two joined cams individual to said key; means responsive to operation of said key to give said cams a cycle of operation; master-wheel-actuating means cooperating with one of said cams; a lever, a motion-transmitting connection from said lever to said type, said lever having a part movable to position to engage the other one of said cams for enabling said other one cam to operate said lever to operate said type, said lever-part being normally out of said position, and means cooperative with said master-wheel-actuating means to effect movement of said part into and out of said position.

2. In a combined typewriting and computing machine having a letter-feedable carriage, a master-wheel and a set of totalizer-wheels engageable seriatim with said master-wheel by means of said carriage; the combination of a numeral-value type; a numeral-value key; two joined cams individual to said key; means responsive to operation of said key to give said cams a cycle of operation; master-wheel-actuating means cooperating with one of said cams; a lever, a motion transmitting connection from said lever to said type, said lever including an element hinged so as to be movable laterally to position to engage the other one of said cams for enabling said other one cam to operate said lever to operate said type, said element being normally out of said position, and means cooperative with said master-wheel-actuating means to effect movement of said element into and out of said position.

3. In a combined typewriting and computing machine having a letter-feedable carriage, a master-wheel and a set of totalizer-wheels engageable seriatim with said master-wheel by means of said carriage; the combination of a numeral-value type; a numeral-value key; two joined cams individual to said key; means responsive to operation of said key to give said cams a cycle of operation; master-wheel-actuating means, including a member engaging and cooperating with one of said cams; a lever; a motion-transmitting connection from said lever to said type; said lever including an element hinged so as to be movable laterally to position to engage the other one of said cams for enabling said other one cam to operate said lever to operate said type; a spring normally keeping said element out of said position, and an operative connection from said member of the master-wheel-actuating means to enable said member in its operation to effect movement of said element into and out of said position.

4. In a typewriting-accounting machine, the combination with a power shaft; a set of manually operable key levers; a type bar and its type bar action associated with each key lever; and connections between the key levers and their type bar actions to engage the selected type action with the power shaft to effect a printing operation of the corresponding type bar upon depression of a key; of a second set of keys corresponding with said first-named set of keys; a second power shaft; linkages individual to the several type bar actions and connected therewith to effect printing operations of the corresponding type bars independently of the first-named set of keys, each linkage including a normally displaced element; normally idle actuating members for the respective linkages; means operable upon depression of any of said second set of keys to connect its associated actuating member with said second power shaft; a control device associated with the respective actuating members, and rotatable therewith; normally idle means individual to, and associated with, each control device, to shift the appurtenant normally displaced element to effective position and retain it therein during a predetermined movement of the active control device; and means to return said element to displaced position upon its release from said shifting means.

5. In a typewriting-accounting machine, the combination with a power shaft; manually operable numeral typing key levers; type actions controlled by said numeral typing key levers, including sub-levers and type bars; and means operable by the numeral typing key levers to engage their respective type actions with the power shaft to print the corresponding digits; of manually operable calculating key levers; means controlled by the calculating key levers to effect imprints from said corresponding type bars independently of the numeral key levers, including a second power shaft, a normally idle driving member, means controlled by a calculating key lever to connect the driving member with said second power shaft, an actuating train of mechanism, including a normally ineffective disconnectible element, said train operable by the driving member to transmit a typing movement to the type action; a control member operable by said second power shaft; means under control of the control member to render effective the normally ineffective disconnectible element of the actuating train of mechanism and to retain it in effective position as determined by the control member; and means to automatically restore the disconnectible element to its ineffective position to disrupt the actuating train of mechanism at the conclusion of a typing operation.

6. In a power-driven typewriting-accounting machine, the combination with a power source; a set of manually-operable numeral typing key levers; type actions controlled by the respective numeral typing key levers, each type action including a sub-lever, and a type bar; and means individual to, and operable by, the numeral typing key levers to connect their respective type actions with the source of power to print the corresponding digits; of additional means to connect said type actions with the source of power to effect imprints from the corresponding type bars independently of the numeral typing key levers, including manually-operable calculating key levers; a normally idle driving member individual to each calculating key lever; means controlled by the respective calculating key levers to connect the corresponding driving member for operation by the power source; an actuating train of mechanism individual to each calculating key lever, including a transmitting member operable by the driving member, and an intermediate element in operable relation with the corresponding type action and shiftable into and out effective relation with the transmitting member, to impart a typing movement to the type action when in its effective position; a control member operable by said power source; means under control of the control member to shift the intermediate element to effective relation with the transmitting member, prior to actuation of the latter by its driving member, and to retain the intermediate element effective as determined by the control member; and means to automatically restore the intermediate element to its ineffective position to disrupt the actuating train of mechanism at the conclusion of a typing operation, and subsequent to actuation of said intermediate element by said transmitting member.

7. In a power-driven typewriting-accounting machine, the combination with a source of power; a set of manually operable numeral type printing key levers, type actions controlled by the respective key levers, each type action including a sub-lever, and a type bar; and means individual to, and operable by the numeral typing key levers to connect their respective type actions with the source of power to print the corresponding digits; of additional means to effect printing operations of the type actions independently of the numeral typing key levers, including a set of manually operable calculating key levers; a normally idle driving member individual to each calculating key lever; means controlled by the respective calculating key levers to connect the corresponding driving member for operation by the power source; an actuating train of mechanism individual to each calculating key lever, including a bell crank lever having an offset arm, and operable by its corresponding drive member, and a thrust bar interposed between the offset arm of the bell crank and the type action, said thrust bar shiftable longitudinally and also transversely of its longitudinal axis; means normally effective to maintain the thrust bar out of effective relation with the offset arm of the bell crank; a control member operable in consonance with the driving member; and means under control of the control member to shift the thrust bar into operative relation with the bell crank, and to retain the thrust bar in such position until after its operation by the bell crank.

ROBERT ANSCHÜTZ.